June 14, 1938.　　T. G. McDOUGAL ET AL　　2,120,338
SPARK PLUG INSULATOR
Filed Nov. 16, 1935
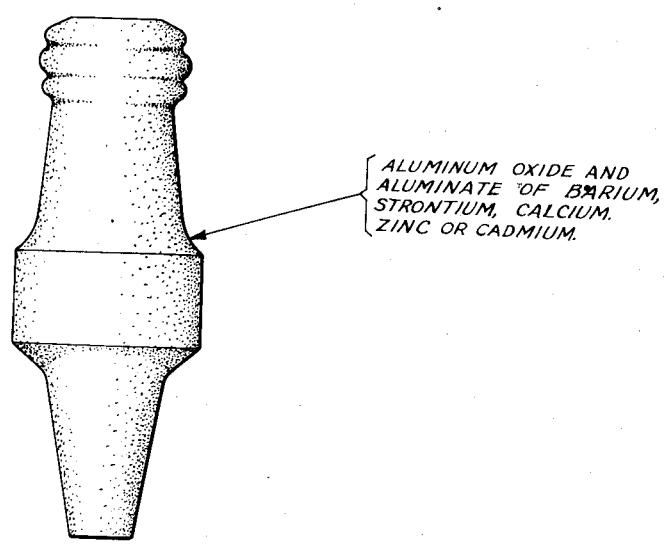
ALUMINUM OXIDE AND
ALUMINATE OF BARIUM,
STRONTIUM, CALCIUM,
ZINC OR CADMIUM.
Inventors
Taine G. McDougal,
Albra H. Fessler &
Karl Schwartzwalder
By Blackmon, Spencer & Hunt Attorneys Patented June 14, 1938

2,120,338

UNITED STATES PATENT OFFICE 2,120,338

SPARK PLUG INSULATOR

Taine G. McDougal, Albra H. Fessler, and Karl Schwartzwalder, Flint, Mich., assignors to General Motors Corporation, Detroit, Mich., a corporation of Delaware Application November 16, 1935, Serial No. 50,244

12 Claims. (Cl. 106—12)

This invention has to do with spark plug insulators consisting of alumina together with a metallic oxide, characterized by the fact that the fired body consists of a plurality of crystalline phases united into a dense, compact structure, one of the crystalline phases being corundum while the other is an aluminate.

One of the principal difficulties encountered with present day spark plug insulators is the fact that they are relatively poor conductors of heat, and consequently under severe conditions of engine operation are likely to become hot and cause preignition. Insulators made according to the present invention are characterized by high thermal efficiency, and as a consequence the insulators are maintained at a relatively low temperature and preignition is avoided. The improved insulators are also marked by good mechanical strength, good resistance to heat shock, good resistance to the passage of electricity, both at high and low frequency, as well as other properties essential for satisfactory performance in modern automobile engines.

The group of oxides to which this invention relates includes barium oxide, strontium oxide, zinc oxide, calcium oxide and cadmium oxide. It will be noted that these are all oxides of metals falling in Group 2 of the periodic table and range in atomic weight from 40.07 in the case of calcium to 137.37 in the case of barium.

Insulators made with the addition of oxides of this group possess a physical structure differing substantially from that of insulators made wholly of alumina. It is found that alumina upon recrystallizing at high temperatures has a tendency to contain gas vesicles or blebs, even though it has been completely melted and allowed to crystallize from the molten state. With the addition of the above oxides the percentage of voids is greatly reduced producing substantially clear crystals of corundum possessing desirable physical characteristics. The compounds formed by union of the oxides with alumina are likewise substantially free from voids. As a consequence the bodies are quite dense. These compounds also appear to aid considerably in increasing the heat conductivity of the insulators, thereby increasing their thermal efficiency and reducing the possibility of preignition when in use in the engine.

On the drawing there is shown a side elevation of a typical spark plug insulator embodying our invention.

The bodies may be made in the usual manner by finely grinding and thoroughly mixing the materials and forming them by any known methods adapted for use with non-plastic materials. Thus, the insulators may be molded into shape with the aid of a suitable binder according to the method disclosed in the Schwartzwalder application Serial No. 3,465, filed January 25, 1935, by pressing in rubber molds as described in the application of Albra H. Fessler and Ralston Russel, Jr., Ser. No. 28,630, filed June 27, 1935; by casting, or by any other of the known methods used in forming bodies from non-plastic materials. The first mentioned method has been found to be preferable because the resulting insulator possesses a smooth, glossy surface requiring no glaze.

The formed bodies are then fired to a suitable temperature to produce recrystallization, and this is usually accompanied by considerable shrinkage. The firing time and temperature must be controlled as in usual kiln practice so as to secure complete recrystallization, and to avoid over-firing with resultant warpage or other injury to the product. Firing temperatures of from cone 30 to cone 35 (1375° C. to 1830° C.) will be found satisfactory, the exact temperature depending upon the composition of the body.

Since the oxides of barium, strontium and calcium are soluble in water where the process of manufacture is such that water is employed, it may be necessary to employ an insoluble compound containing the oxide, such as the carbonate. In the firing of the body the carbonate is reduced to the oxide at an early stage. While it might be expected that insulators made with these oxides would prove unsatisfactory in service owing to the fact that the compounds which they form with alumina might react with water resulting from combustion, it has been found that by using comparatively small amounts of oxides in the body no trouble is experienced. Thus, we have had success with insulators having an oxide content on the order of 3%.

Since the oxides of cadmium and zinc are insoluble in water as are also the compounds which they form with alumina on firing, greater amounts of these oxides may be employed. However, insulators made of these materials possess slightly less desirable electrical and thermal properties.

Especially good bodies have been obtained with barium oxide added in the form of the carbonate. These bodies have been characterized by very high thermal conductivity, good mechanical strength, excellent resistance to heat shock, as well as high electrical resistance. Bodies made with the oxides of calcium and strontium have likewise been characterized by high electrical resistance, and with the other necessary properties in a degree to render them very satisfactory as spark plug insulators.

It is to be expected that some further reduction in firing temperature may be accomplished by the addition of small amounts of fluxes in accordance with usual ceramic practice.

We may also, if desired, employ mixtures of oxides of the group, and may, if desired, add small amounts of oxides entering into solid solution with alumina such as those described and claimed in the application of Taine G. McDougal, Albra H. Fessler and Karl Schwartzwalder, Serial No. 50,242, filed November 16, 1935. We may also add proportions of eutectic forming oxides such as those described in the application of Taine G. McDougal Albra H. Fessler and Helen Blair Barlett, Serial No. 50,243, filed November 16, 1935. The described bodies are characterized by a plurality of crystalline phases, one of which is alpha corundum, while the other is an aluminate of the metal added in oxide form.

We claim:

1. A spark plug insulator made of recrystallized alumina together with crystalline aluminate of one of the metals of the second group of the periodic table having an atomic weight between 40 and 138.

2. A spark plug insulator in the form of a dense, non-porous mass of crystals of alumina and an aluminate of one of the metals of the group comprising barium, strontium, calcium, zinc and cadmium.

3. A spark plug insulator in the form of a dense, non-porous body consisting of an intimate mixture of alpha corundum and barium aluminate.

4. A spark plug insulator in the form of a dense, non-porous body consisting of an intimate mixture of alpha corundum and strontium aluminate.

5. A ceramic body for use as a spark plug insulator formed by molding from an intimate mixture of finely powdered aluminum oxide and a refractory compound of one of the metals of the second group of the periodic table having an atomic weight between 40 and 138, the molded body being fired to vitrification.

6. A ceramic body for use as a spark plug insulator formed by firing to vitrification a shape molded from an intimate mixture of finely powdered aluminum oxide and a small proportion of an oxide of the group consisting of barium oxide, strontium oxide and calcium oxide.

7. An insulator for spark plugs and the like formed by molding from an intimate mixture of finely powdered aluminum oxide and a refractory compound of one of the metals of the second group of the periodic table having an atomic weight between 40 and 138, and firing to temperatures on the order of from 1375° C. to 1830° C. to produce a dense, non-porous sintered mixture of corundum and metallic aluminate.

8. A spark plug insulator in the form of a dense, non-porous body consisting of an intimate mixture of alpha corundum and calcium.

9. A dense, non-porous electrical insulator consisting essentially of an intimate mixture of alpha corundum and barium aluminate.

10. An electrical insulator in the form of a dense, non-porous ceramic body consisting predominantly of recrystallized alumina together with small proportions of crystalline aluminate of one of the metals of the second group of the periodic table having an atomic weight between 40 and 138.

11. A ceramic body characterized by a dense, non-porous recrystallized structure, said body consisting predominantly of corundum intimately associated with on the order of 3% of an aluminate from the group consisting of barium aluminate, strontium aluminate and calcium aluminate.

12. An insulator for spark plugs and the like consisting of corundum and an aluminate of one of the metals of the second group of the periodic table having an atomic weight between 40 and 138, sintered into a dense, non-porous mass.

TAINE G. McDOUGAL.
ALBRA H. FESSLER.
KARL SCHWARTZWALDER.